(12) United States Patent
Secora et al.

(10) Patent No.: US 7,891,621 B1
(45) Date of Patent: Feb. 22, 2011

(54) MOUNTING APPARATUS IN SUPPORT OF A DEVICE FROM A PLATFORM

(75) Inventors: Gary Secora, Menomonee Falls, WI (US); Ryan Ramos, Greenfield, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/607,557

(22) Filed: Oct. 28, 2009

(51) Int. Cl.
*E04G 3/00* (2006.01)

(52) U.S. Cl. .............. 248/292.12; 248/226.11; 248/229.25

(58) Field of Classification Search .............. 248/291.1, 248/292.4, 292.12, 292.13, 284.1, 286.11, 248/229.25, 229.15; 5/503.1, 507.1
See application file for complete search history.

(56) References Cited

U.S. PATENT DOCUMENTS

| | | | |
|---|---|---|---|
| 4,158,489 A | 6/1979 | Gottschalk et al. | |
| 4,158,490 A | 6/1979 | Gottschalk et al. | |
| 4,447,031 A | 5/1984 | Souder, Jr. et al. | |
| 4,460,302 A | 7/1984 | Moreau et al. | |
| 4,503,854 A | 3/1985 | Jako | |
| 4,572,594 A | 2/1986 | Schwartz | |
| 4,625,731 A | 12/1986 | Quedens et al. | |
| 5,034,618 A | 7/1991 | Akeel et al. | |
| 5,330,054 A * | 7/1994 | Brown | 206/459.5 |
| 5,337,732 A | 8/1994 | Grundfest et al. | |
| 5,487,524 A | 1/1996 | Bergetz | |
| 5,630,566 A | 5/1997 | Case | |
| 5,799,917 A * | 9/1998 | Li | 248/284.1 |
| 5,850,424 A | 12/1998 | Challberg et al. | |
| 6,796,541 B2 * | 9/2004 | Lu | 248/291.1 |
| 7,487,943 B1 | 2/2009 | Gillespie | |
| 7,513,469 B1 | 4/2009 | Ciungan | |
| 2004/0159757 A1* | 8/2004 | Pfister | 248/284.1 |
| 2004/0262477 A1* | 12/2004 | Whitaker et al. | 248/284.1 |
| 2007/0252068 A1 | 11/2007 | Secora | |
| 2008/0027417 A1 | 1/2008 | Secora et al. | |

* cited by examiner

*Primary Examiner*—Ramon O Ramirez
(74) *Attorney, Agent, or Firm*—William T. Kryger

(57) ABSTRACT

An apparatus and method to support a device from a platform is provided. The apparatus can comprise a clamp attached to the apparatus at the platform, a mount plate to receive the device, and a clutch assembly interconnecting the mount plate with the clamp. The clutch assembly can be operable to maintain a generally same pre-defined alignment of the mount plate and supported device during movement of the mount plate from a raised position of the mount plate above the platform to a lowered position of the mount plate below the platform.

19 Claims, 4 Drawing Sheets

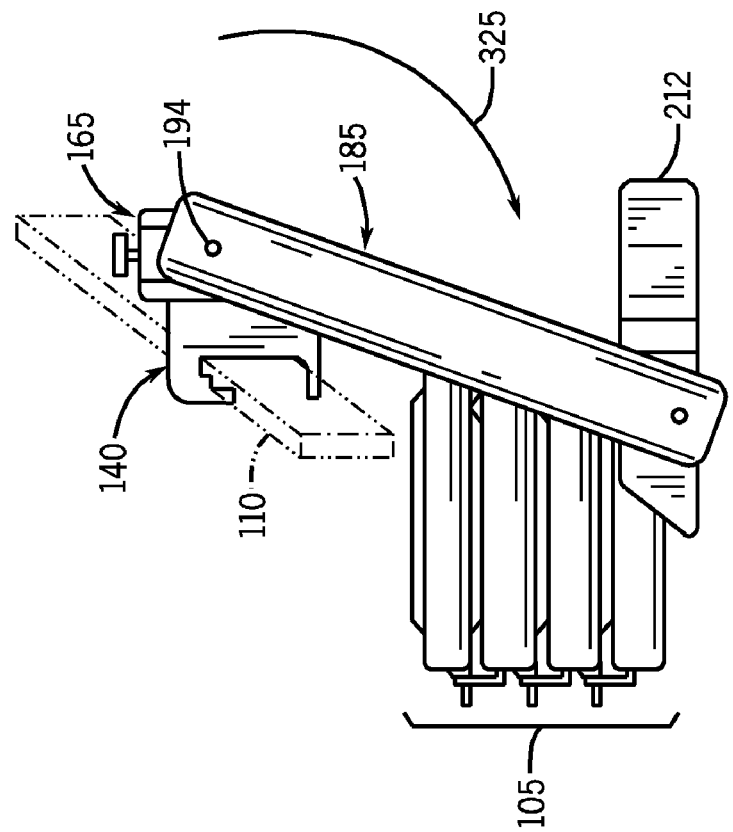
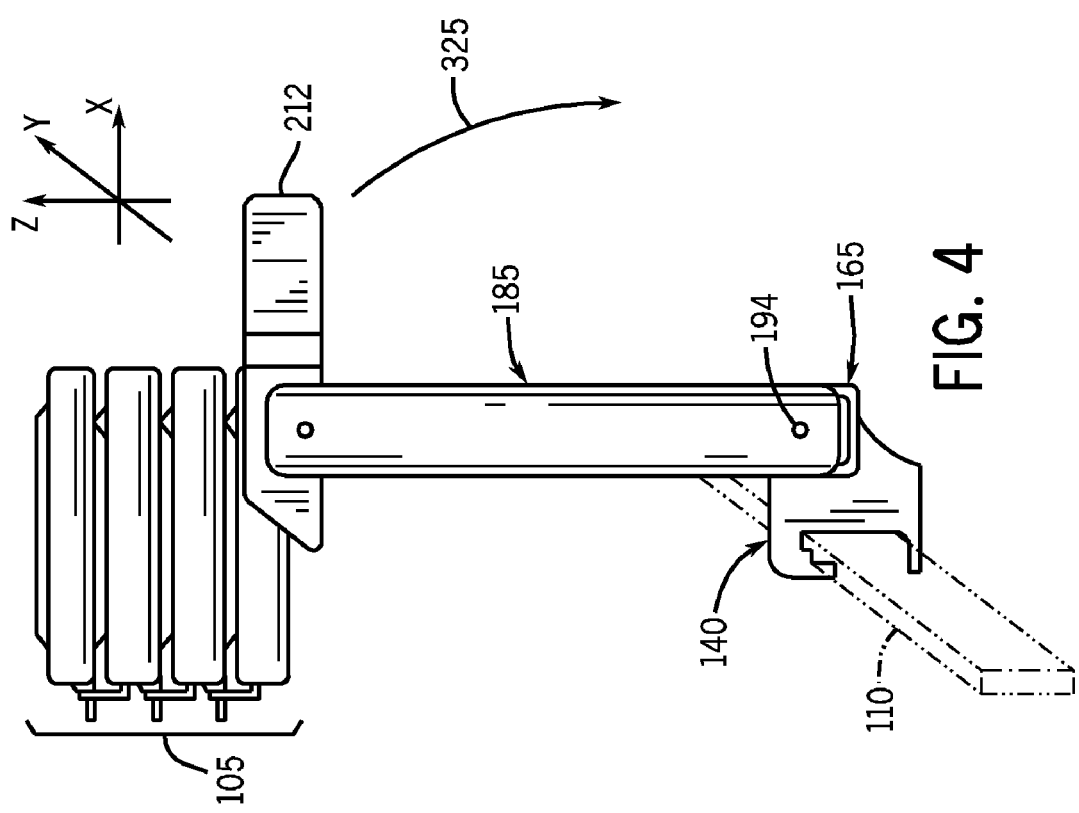
FIG. 5
FIG. 4

MOUNTING APPARATUS IN SUPPORT OF A DEVICE FROM A PLATFORM

BACKGROUND

The present subject matter relates generally to the field of mounting apparatuses and specifically to an apparatus capable of supporting devices from a platform.

Various mounting apparatus have been developed to support devices from platforms. The mounting apparatus can be located in various environments (e.g., healthcare, aviation, households, commercial, industrial) where desired access to the supported device or to the platform can change.

BRIEF SUMMARY

There is a need for a mounting apparatus that allows for a supported device to be in close proximity to the platform that the mounting apparatus supports from. There is also a need for mounting apparatus that remains in a relatively fixed position relative to the platform that the apparatus supports the device therefrom during use of the device. There is also a need for mounting apparatus that may be positioned in close proximity to an operator using the device, as well as that can be quickly cleared away from the area when desired. The above-described needs can be addressed by the apparatus and method of the subject matter described herein.

An embodiment of an apparatus to support a device from a platform is provided. The apparatus comprises a clamp to attached the apparatus at the platform; a mount plate to receive the device; and a clutch assembly interconnecting the mount plate with the clamp. The clutch assembly can be operable to maintain a generally same pre-defined alignment of the mount plate and supported device during movement of the mount plate from a raised position of the mount plate above the platform to a lowered position of the mount plate below the platform.

An embodiment of a method of supporting a device from a platform is provided. The method can comprise the steps of attaching a mounting apparatus at the platform, with the mounting apparatus including a mount plate in connection with a clutch assembly; and coupling the device at the mount plate. Movement of the device can be constrained by frictional restrain on the clutch assembly. The method can further include the step of releasing frictional restraint on the clutch assembly in response to a force applied at an actuator handle so as to move the mount plate and supported device between a raised position above the platform and a lowered position below the platform while maintaining a same general pre-defined alignment of the mount plate and supported device during the movement of the mount plate and supported device.

Apparatuses and methods of varying scope are described herein. In addition to the aspects and advantages described in this summary, further aspects and advantages will become apparent by reference to the drawings and with reference to the detailed description that follows.

BRIEF DESCRIPTION OF THE DRAWINGS

FIG. 4 illustrates an elevation view of an embodiment of the mounting apparatus in the raised position.

FIG. 5 shows an elevation view of an embodiment of the mounting apparatus in a lowered position.

DETAILED DESCRIPTION

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
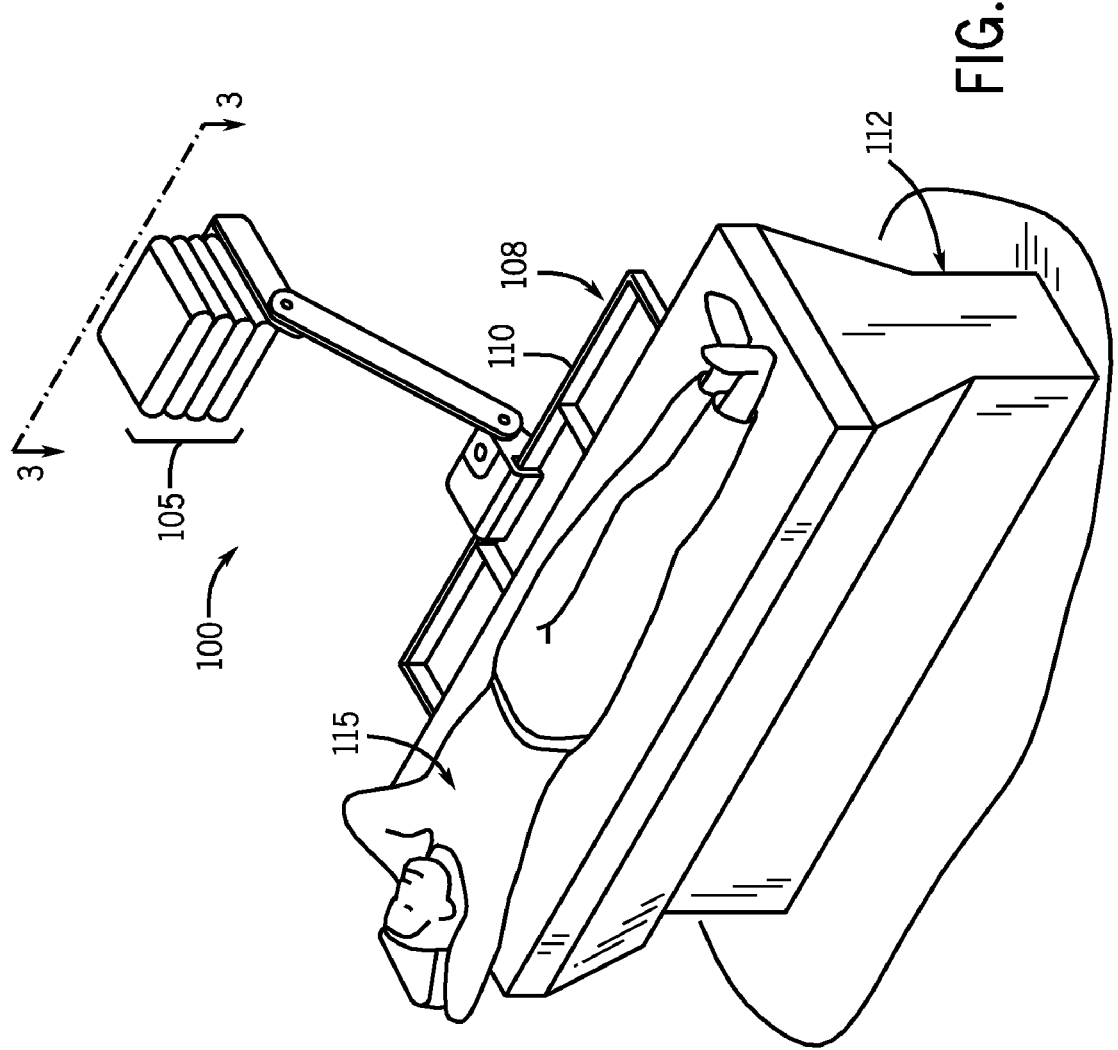
FIG. 1 illustrates a perspective view of an embodiment of a mounting apparatus coupled to a patient bed according to the subject matter described herein.

Referring to FIG. 1, an embodiment of a mounting apparatus 100 in support of a medical device 105 from a platform 108 is shown. While the illustrated platform 108 is a bedrail 110 of a bed 112, the type (e.g., table such as an operating table or examination table, other type of bed, a conveyor belt, etc.) of platform 108 may vary in support of the subject 115. While the illustrated exemplary embodiment shows subject of interest 115 to be a human being, in other exemplary embodiments subject of interest 115 may be another living organism (e.g., animal); or a non-anatomical structure (e.g., luggage, transport container, etc.) that one wishes to retrieve images from.

The mounting apparatus 100 can be generally configured to support the medical device 105 and can be coupled to platform 108. The mounting apparatus 100 can be capable of positioning the medical device 105 in a variety of locations as desired by a clinician for various reasons such as for best viewing or so as to not be obstructing any procedure performed on the subject 115.

Figure 2:
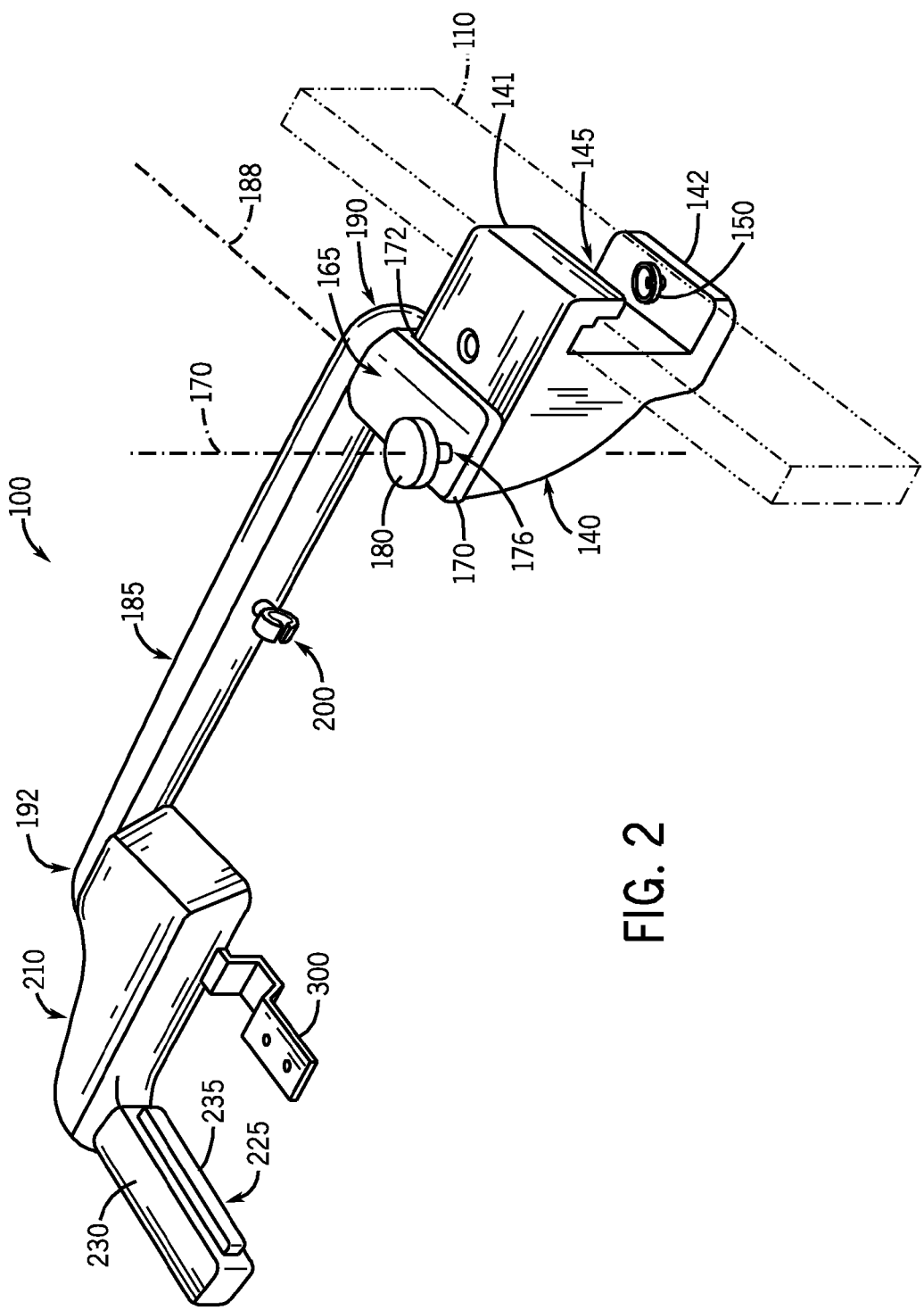
FIG. 2 shows a detailed perspective view of the embodiment of the mounting apparatus of FIG. 1.
Figure 3:
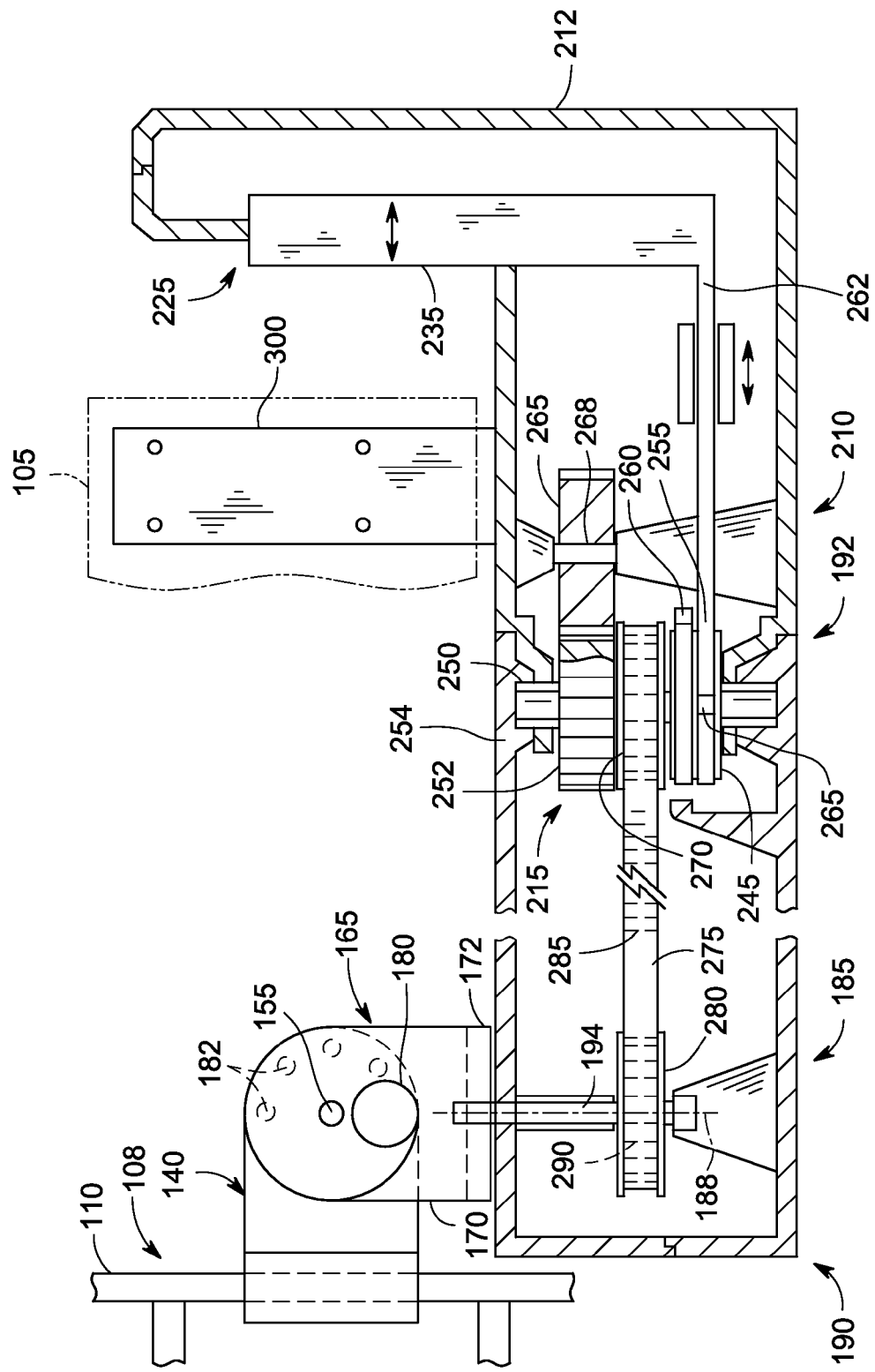
FIG. 3 shows a detailed cross-sectional view of an embodiment of the mounting apparatus according to the subject matter described herein.

Referring now to FIGS. 2 and 3, one embodiment of the mounting apparatus 100 can generally include a clamp 140 configured to couple and decouple the mounting apparatus 100 with respect to the platform 108. An embodiment of the clamp 140 can generally include a pair of legs 141, 142 that defines a slot or opening 145 therebetween to receive the platform 110. The clamp 140 can further include a screw or similar adjustable mechanism 150 to cause contact against the bedrail 108, thereby securing the clamp 140 from movement with respect to the platform 110.

The mounting apparatus 100 can further include a pivot pin 155 that defines a generally vertically aligned axis about which the clamp 140 pivotally couples three-hundred sixty degrees with respect to a bracket assembly 165. An embodiment of the bracket assembly 165 generally includes an L-shaped member that defines a first leg 170 generally perpendicular aligned with respect to a second leg 172 so as to receive or engage the clamp 140 therebetween. The first leg 170 includes an opening 176 to receive the pivot pin 155 therethrough. A spring plunger 180 can be configured to extend through the first leg 170 of the bracket assembly 165 and through one of series of generally equal distance, spaced apart indexing openings 182 through in the clamp 140 so as to lock or restrain the position of the clamp 140 in variable pivotal relation to the bracket assembly 165.

The mounting apparatus 100 can further include an extension arm 185 pivotally coupled to rotate about a generally horizontal aligned axis 188 with respect to the bracket assembly 165. An embodiment of the extension arm 185 can include a first end 190 opposite a second end 192 and have a hollow interior therebetween. The first end 190 can be pivotally coupled by a pivot or shaft 194 that extends through the second leg 172 of the bracket assembly 165. The shaft 194 can be configured to rotate inside a sleeve bearing with respect to the extension arm 185 and be rigidly attached at the bracket assembly 165. An embodiment of the extension arm 185 can further include a cable holder 200 pivotally coupled between the first and second ends 190, 192 to the extension arm 185. The cable holder 200 can be configured to receive cables or data buses or miscellaneous wires associated with operation of the medical device 105, and restrain movement of such with the respect to the extension arm 185 to avoid entanglements or interference with the delivery of healthcare to the subject 115.

The mounting apparatus 100 can further include a head assembly 210 pivotally coupled by a clutch assembly 215 with respect to the second end of the extension arm 185. An embodiment of the clutch assembly 215 can allow the head assembly 210 to rotate about a generally horizontal aligned axis 220 with respect to the extension arm 185.

One embodiment of the head assembly 210 includes a housing 212 and an actuator assembly 225 mechanically coupled to the clutch assembly 215. An embodiment of the release actuator assembly 225 includes an actuator handle 235 operable to move with respect to the housing 212.

An embodiment of the clutch assembly 215 includes a clutch drum 245 fixedly connected or rigidly coupled to a shaft 250 and a first gear 252 (first gear also rigidly connected to shaft 250). The shaft 250 is located in bearing sleeve 254 to as to rotate with respect to the extension arm 185 and with respect to the housing 212. The clutch drum 245 can also be mechanically interconnected by a spring 255 to the actuator handle 235. An embodiment of the spring 255 can be torsion spring is wrapped around a circumferential perimeter of the clutch drum 245. The spring 255 can have a first end 260 fixedly connected (e.g., weld) at the actuator housing 212, and a second end 262 fixedly connected at the actuator handle 235. With the actuator handle 235 in the resting position or with no force applied there against, the spring 255 can engage against the clutch drum 245 so as to restrain rotational movement of the clutch drum 245 and rigidly attached shaft 250 with respect to the actuator housing 212 and handle 235. A force applied to move (e.g., squeezing) the actuator handle 235 from the resting position with respect to the housing 212 can cause the spring 255 to expand or open to a diameter/circumference greater than that of the clutch drum 245, thereby releasing frictional restraint against movement of the clutch drum 245 and shaft 250. The expansion of the diameter of the spring 255 and removal of frictional restraint can allow the clutch drum 245 and shaft 250 to rotate with respect to the actuator assembly 225.

The clutch assembly 215 also includes a second gear 265 in meshed engagement with the first gear 252 such that the first gear 252 rotates with the second gear 265, and vice versa. The second gear 265 is rigidly connected at the housing 212 (e.g., weld or pressed connection of a shaft 268 rigidly attached to the housing 212) of the head assembly 210.

The clutch assembly 215 further includes a pulley drum 270 rigidly connected to the shaft 250 passing therethrough. The pulley drum 270 is in engagement with a pulley belt or reinforced belt 275 that wraps around the circumference of the pulley drum 270 and extends through the hollow interior of the extension arm 185 to wrap around a circumference of a pulley drum 280 rigidly attached to the shaft 194. An embodiment of the pulley belt or reinforced belt 275 includes teeth or other spaced protrusions 285 along its length configured to engage teeth or similar spaced protrusions 290 along a circumference or perimeter of the pulley drums 270 and 280 so as to minimize or reduce slippage.

One embodiment of the clutch assembly 215 includes generally a one to one ratio (1:1) of rotation or angular displacement of the clutch or brake drum 245 with displacement of the pulley belt 275, the first and second pulley drums 270, and the first and second gears 252, 265. This 1:1 ratio of the arrangement of the clutch assembly 215 described above can allow the same general angular alignment (relative to vertical) of the medical devices 105 to be maintained with vertical displacement or movement of the medical devices 105 relative to the platform 108 or bedrail 110 of the bed 112.

A device mount plate 300 is rigidly attached at the exterior of the housing 212. The device mount plate 300 can be configured to receive medical devices 105 to be supported from the bedrail 110. An embodiment of device mount plate 300 can be adjustable or variably connectable to support the medical devices 105 at various special positions with the respect to the housing 212. An embodiment of medical devices 105 can include enclosures of a pass through device 310 stacked in relation to enclosures of a series of catheter input modules/connectors (CIMS) 315 operable to receive catheter cables. The pass-through device 310 can include cables or connectors operable to receive data streams from the CIMs 315 and pass through the data stream to a monitor or display device for illustration to the operator. Yet, the type of medical devices (e.g., computer laptops, ultrasound displays, etc.) 105 supported by the device mount plate 300 can vary.

Having described the general construction of the mounting apparatus 100, the following is a description of a method of operating the mounting apparatus 100 in supported movement of supported devices 105 in relation to the platform. It should be understood that the sequence of the acts or steps of the method as discussed can vary. Also, it should be understood that the method may not require each act or step in the foregoing description, or may include additional acts or steps not disclosed herein.

Assume for sake of example that the mounting apparatus 100 is in support of a series of stacked medical devices 105 in relation to the bedrail 110 of the patient bed 112. The mounting apparatus 100 can be attached or coupled by the clamp 140 to a bedrail 110 of a patient bed 112. As illustrated in FIG. 4, the mounting apparatus 100 can support the stacked series of medical devices 105 in a raised position with respect to the platform 108 or bedrail 110 of the patient bed 112. The stacked series of medical devices 105 can be secured, coupled or rest on the mount plate 300 of the mounting apparatus 100. The mount plate 300 and supported stacked series of medical devices 105 can be maintained in the same general angular alignment relative to a fixed reference (e.g., platform 108, vertical axis or horizontal plane, bedrail 110, floor, etc.).

The plunger 180 (see FIG. 3) of the mounting apparatus 100 extends through one of the series index openings 182 so as to align the extension arm 185 in general perpendicular alignment to the bedrail 110, and to position angular alignment of the mount plate 300 and supported medical devices 105 along a general horizontal x-y plane relative to the bedrail 110 about the pivot pin 155. Removal or release of the plunger 180, rotation of the bracket assembly 165, extension arm 185 and mount plate 300 and supported devices 105 about pivot pin 155 and insertion of the plunger 180 in another of the series of index openings 182 causes variable angular alignment of the extension arm 185, mount plate 300 and supported medical devices 105 in the general horizontal x-y plane (e.g., as defined by the pivot pin 155) with respect to the reference (e.g., the platform 108, bedrail 110, or bed 112). Also, the height or distance of the mount plate 300 and supported medical devices 105 can be adjusted with respect to the bedrail 110 through adjustment of the mount plate 300 or through adjustment of the location of the shaft 194 along a slot 320 extending along a length of the extension arm 185.

In the rest position, the friction of the spring 255 against the circumference of the clutch or brake drum 245 restrains movement of the drum 245. Restraint of the clutch or brake drum 245 can restrain movement of the rigidly attached pulley drum 270 and first gear 252 on the shaft 250. Restraint of the first gear 252 also causes restraint of the second gear 265 and attached shaft 268 so as to restrain movement of the housing 212 and attached mount plate 300 and supported medical devices 105 relative to the platform 108 or bedrail 110. The teeth or protrusions 285 of the belt 275 prevent or restrain slippage of the belt 275 with respect to the pulley drums 270 and 280. Restraint of the brake drum 245 also causes restraint of the pulley drum 280 and rigidly attached shaft 194 so as to restrain movement of the extension arm 185 with respect to the clamp 140, platform 108 or bedrail 110. Thereby, the frictional restraint of the spring 255 in the rest position against the brake drum 245 restrains the mount plate 300 and supported medical devices 105 in the raised or any desired position.

Application of a force against the actuator handle (e.g., squeeze of actuator handle against or towards housing) 235 of the actuator assembly 225 increases or expands the diameter of the spring 255 so as to release friction against the brake drum 245, releasing the drum 245 and rigidly attached shaft 250 and first gear 252 to rotate. Downward swing or movement 325 of the actuator handle 235, mount plate 300 and supported medical devices 105 from the raised position causes angular displacement or movement of the housing 212 with respect to the extension arm 185, and thereby causes rotation of the shaft 250. However, the general angular alignment (relative to vertical) of the mount plate 300 and supported medical devices 105 (e.g., relative to vertical z or horizontal x-y plane) does not change with downward movement of mount plate 300 and supported medical devices 105 on the mounting apparatus 100 from the raised position (FIG. 4). Rather, the mounting apparatus 100 can generally maintain the mount plate 300 and supported medical devices 105 in the same angular alignment (relative to vertical) with movement or any variable position (e.g., between the raised and lowered position) of the mount plate 300 and supported medical devices 105 with respect to the bed rail 110. The angular alignment of the mount plate 300 and supported medical devices 105 (relative to vertical) can be adjusted by unsecuring the first or second gear 252, 265 and disengaging the meshed engagement of the gears 252, 265, rotating the housing 212 and attached mount plate 300 to the desired alignment relative to vertical, and then re-establishing engagement of the gears 252, 265, and re-securing attachment one of the first or second gears 252, 265 to the mounting apparatus 100. Otherwise, the mounting apparatus 100 and clutch assembly 215 restrain changes in alignment of the mount plate 300 and supported devices 105 described above with movement of the mount plate 300 and supported devices 105 at any variable location between the raised (FIG. 4) and lowered (FIG. 5) positions.

Referring to FIGS. 4 and 5, actuation or force on the actuator handle 235 and downward movement of the actuator handle 235, mount plate 300 and supported medical devices 105 causes angular displacement or rotation of the extension arm 185 with respect to the actuator handle 235 or housing 212 with respect to the extension arm 185 about the shaft 250 of the clutch assembly 215, as well as causes a change in angular displacement or rotation of the extension arm 185 in a clockwise direction relative to the clamp 140, platform 108, or bedrail 110 of the bed 112. The above-described downward movement 325 can cause the shaft 268 and fixedly attached second gear 265 via meshed interaction to rotate the first gear 252 and attached shaft 250. Rotation of the first gear 252 and attached shaft 250 can cause the rigidly attached first pulley drum 270 to also rotate therewith. The rotation of the first pulley drum 270 and meshed or interaction of the protrusions 285 along the belt 275 can cause the angular alignment of the belt 275 to rotate with respect to the second pulley drum 280. The second pulley drum 280 and attached shaft 194 are fixed with respect to the bracket assembly 165.

Release of the force against the actuator handle 235 causes the spring 255 to return to the rest position in frictional restraint against the circumference or perimeter of the brake drum 245, thereby restraining movement of the clutch assembly 215 and overall mounting apparatus 100 in any position of the mounting apparatus 100 at the time of release of the force against the actuator handle 235. This described operation and construction of the mounting apparatus 100 allows the mount plate 300 and supported medical devices 105 to be held or maintained in any variable position between the raised and lowered position without need of an external force applied by the operator. The clutch assembly 215, via the meshed interaction of the gears 252, 265 as well as the restraint of the belt 275 against the pulley drums 270 and 280 can maintain the mount plate 300 and supported medical devices 105 in any variable position at the time of restraint of the spring 255 against the brake drum 245. In addition, the mounting apparatus 100 can maintain the mount plate 300 and supported medical devices 105 in the same general horizontal angular alignment with respect to a horizontal plane with variable movement of the mounting apparatus 100 from any location between the raised (FIG. 4) and lowered (FIG. 5) positions.

In the lowered position as shown in FIG. 5, the mounting apparatus 100 can hold or locate the mount plate 300 and attached medical devices 105 in stowed position below and underneath the platform 108, bedrail 110, or patient bed 112 so as to minimize interference with a physician or caregiver at the side of the platform 108, bedrail 110, or bed 112, as well as to minimize interference with movement or loading of the subject 115 to or from the patient bed 112. The actuator handle 235 can be position in general horizontal alignment with the mount plate 300 and located outward relative to the mount plate 300 and supported medical devices 105 so as to be nearest the operator relative thereto for ready access and actuation with minimized interference with catheter cables and other connectors extending from the medical devices 105.

A technical effect of the mounting apparatus 100 can be to provide a single mechanism that attaches to the medical devices 105 to the platform 108 or bedrail 110 of the patient bed 112, holds or maintains the general angular alignment of the medical devices 105 whether an operator locates the medical devices 105 above or below the platform 108 or patient bedrail 112 or at any location therebetween. Another technical effect of the mounting apparatus 100 can be to allow medical devices 105 to be rotated about a generally vertical axis so as to face an opposite side of the platform 108 or bedrail 110 of bed 112 when the mounting apparatus 100 is located at a raised or upright position. Another technical effect of the mounting apparatus 100 is to provide a mechanism that maintains attachment or support of the medical devices 105 at the platform 108 or bedrail 110 of the patient bed 112 while the subject 115 is loaded to or unloaded from the bed 112.

Although specific shapes of each element have been set forth in the drawings, each element may be of any other shape that facilitates the function to be performed by that element. For example, the mount plate 300 is shown to have a rectangular shape of thin cross-section, however, in other embodiments plate member 30 may be of a square shape, or an oval, or be of any cross-section and may include several separate members. In various exemplary embodiments, each of the parts of the mounting apparatus 100 may be composed of any material (e.g., aluminum, steel, plastic, fiberglass, or any combination thereof) suitable for a rigid support of the devices 105.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally defined as a single unitary body with one another or with the two components or the two components and any additional member being attached to one another. Such joining may be permanent in nature or alternatively may be removable or releasable in nature This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. An apparatus to support a device from a platform, the apparatus comprising:
   a clamp to attach the apparatus at the platform;
   a mount plate to receive the device;
   a clutch assembly interconnecting the mount plate with the clamp, the clutch assembly operable to maintain a generally same pre-defined alignment of the mount plate and supported device during movement of the mount plate from a raised position of the mount plate above the platform to a lowered position of the mount plate below the platform; and
   an actuator handle in connection by a spring to the clutch assembly, wherein the actuator handle and spring in a rest position causes frictional restraint on the clutch assembly so as to hold the mount plate and supported device at any variable position between the raised and lowered position.

2. The apparatus of claim 1, further comprising:
   an extension arm pivotally connected to rotate along a vertical plane with respect to the clamp, wherein at least a portion of the clutch assembly is located within the extension arm.

3. The apparatus of claim 1, wherein application of a force on the actuator handle causes the spring to release frictional restraint on the clutch assembly and movement of the mount plate and supported device between the raised and lowered positions.

4. The apparatus of claim 1, further comprising:
   a bracket assembly pivotally connecting the clutch assembly and the mount plate to the clamp, wherein the clutch assembly and the mount plate can rotate and lock at variable positions through a general horizontal plane with respect to the clamp.

5. The apparatus of claim 1, further comprising:
   an actuator handle to control release of movement of the mount plate and supported device, wherein the mounting apparatus maintains an alignment of the actuator handle to in the general same pre-defined alignment of the mount plate during movement of the mount plate from the raised position to the lowered position.

6. The apparatus of claim 1, further comprising:
   an actuator handle;
   a housing and an extension arm;
   wherein the mount plate is attached to the housing, the housing is pivotally connected to the extension arm, and the extension arm is pivotally connected to the clamp;
   wherein application of a force on the actuator handle releases restraint of movement of the clutch assembly and the mount plate.

7. The apparatus of claim 6, wherein the clutch assembly includes:
   a brake drum rigidly connected to a first gear and a first pulley drum along a first shaft in pivotal connection of the extension arm to the housing and the mount plate;
   a second pulley drum rigidly attached to a second shaft in pivotal connection of the extension arm to the clamp; and
   a second gear rigidly attached to the housing and in meshed engagement with the first gear; and
   a pulley belt interconnecting the first pulley drum to the second pulley drum;
   wherein friction restraint of the first pulley drum causes restraint from movement of the second drum and the second gear so as to restrain movement of the extension arm, the housing, the mount plate, and the supported device.

8. The apparatus of claim 7, wherein application of the force against the actuator handle causes expansion of the spring that releases frictional restraint on the first pulley drum such that a mount plate and device move between the raised and lowered positions.

9. The apparatus of claim 8, wherein the spring can restrain movement of the mounting apparatus and supported device from any variable position between the raised and lowered position.

10. The apparatus of claim 8, wherein the pulley belt includes protrusions in engagement with the first and second pulley drums.

11. The apparatus of claim 8, wherein the first and second gears, the first and second pulley drums, and the brake drum are in a one to one ratio arrangement.

12. The apparatus of claim 8, further comprising:
    a bracket assembly pivotally interconnecting the extension arm about a pivot pin to the clamp, wherein the second shaft is fixed attached at the bracket assembly.

13. The apparatus of claim 8, wherein the location of the mount plate is adjustable with respect to the housing.

14. The apparatus of claim 8, wherein the clutch assembly is located within an interior of the extension arm and the housing.

15. The apparatus of claim 8, wherein the platform is a bedrail and the clamp is configured to rigidly attach at the bedrail.

16. The apparatus of claim 8, wherein movement of the mount plate between the raised and lowered positions causes rotation of the first gear and attached first pulley drum with respect to the extension arm and the second pulley drum.

17. A method of supporting a device from a platform, the method comprising the steps of:

attaching a mounting apparatus at the platform, with the mounting apparatus including a mount plate in connection with a clutch assembly;

coupling the device at the mount plate, wherein movement of the device is constrained by frictional restrain on the clutch assembly;

releasing frictional restraint on the clutch assembly in response to a force applied at an actuator handle so as to move the mount plate and supported device between a raised position above the platform and a lowered position below the platform while maintaining a same general pre-defined alignment of the mount plate and supported device during the movement of the mount plate and supported device.

18. The method of claim 17, further comprising the steps of:

applying frictional restraint on the clutch assembly with release of the force so as to hold the mount plate and supported device at any variable position between the raised and lowered positions.

19. The method of claim 17, further comprising the steps of:

maintaining the actuator handle in the same general alignment of the mount plate and supported device during movement from the raised to the lowered positions.

* * * * *